(12) United States Patent
Fletcher

(10) Patent No.: US 6,891,474 B1
(45) Date of Patent: May 10, 2005

(54) ELECTROMAGNETIC IDENTIFICATION LABEL FOR ANTI-COUNTERFEITING, AUTHENTICATION, AND TAMPER-PROTECTION

(75) Inventor: Richard Fletcher, Cambridge, MA (US)

(73) Assignee: Tagsense, Inc., Cambridge, MA (US)

(*) Notice: Subject to any disclaimer, the term of this patent is extended or adjusted under 35 U.S.C. 154(b) by 0 days.

(21) Appl. No.: 10/064,633

(22) Filed: Aug. 1, 2002

Related U.S. Application Data

(60) Provisional application No. 60/309,394, filed on Aug. 1, 2001.

(51) Int. Cl.[7] .............................................. G08B 13/14
(52) U.S. Cl. ............................... 340/572.1; 340/572.8; 340/572.7
(58) Field of Search .......................... 340/572.1, 572.7, 340/572.8, 825.54, 825.34, 572.2, 572.4, 572.6, 571, 551, 7.32, 7.33, 7.37, 10.1, 10.3, 10.33, 10.34; 343/727, 700 R, 728, 726, 795

(56) References Cited

U.S. PATENT DOCUMENTS

| | | | |
|---|---|---|---|
| 4,558,318 A | 12/1985 | Katz | |
| 4,694,283 A | 9/1987 | Reeb | |
| 4,717,673 A | * 1/1988 | Wrighton et al. | ............. 436/68 |
| 5,227,798 A | 7/1993 | Hildebrand | |
| 5,347,263 A | 9/1994 | Carroll | |
| 5,444,223 A | 8/1995 | Blama | |
| 5,508,684 A | 4/1996 | Becker | |
| 5,729,365 A | 3/1998 | Sweat | |
| 6,100,804 A | 8/2000 | Brady | |
| 6,104,311 A | * 8/2000 | Lastinger | ................. 340/10.51 |
| 6,107,920 A | 8/2000 | Eberhardt | |
| 6,201,474 B1 | 3/2001 | Brady | |
| 6,222,452 B1 | * 4/2001 | Ahlstrom et al. | ........ 340/572.1 |
| 6,232,870 B1 | 5/2001 | Garber | |
| 6,255,940 B1 | 7/2001 | Phelan | |
| 6,264,107 B1 | 7/2001 | Thomas | |
| 6,404,339 B1 | * 6/2002 | Eberhardt | ................ 340/572.1 |
| 6,411,213 B1 | 6/2002 | Vega | |
| 6,580,369 B1 | * 6/2003 | Eberhardt et al. | ....... 340/572.1 |

* cited by examiner

*Primary Examiner*—Anh V. La

(57) ABSTRACT

A radio frequency identification label is comprised of a tag circuit 310 electrically coupled to a defined marker region 330 such that the information generated by the tag circuit is dependent on the electronic properties of the marker region 330. The ID information conveyed to an external tag reader is thus a combination of fixed data intrinic to the tag circuit 310 plus a portion of data that is dependent on the electronic properties of the marker region. The marker region 330 can be comprised of various materials with complex structure, such as woven cloth or printed electrically conductive inks, such that the ID code transmitted by the label is thus more difficult to reproduce or to counterfeit. In addition, the marker region 330 can also be arranged to have electrical coupling to the object onto which the label is affixed, thus creating an electronic ID code that is also dependent on the electronic properties of the tagged object itself.

26 Claims, 4 Drawing Sheets

FIGURE 3A
FIGURE 3B
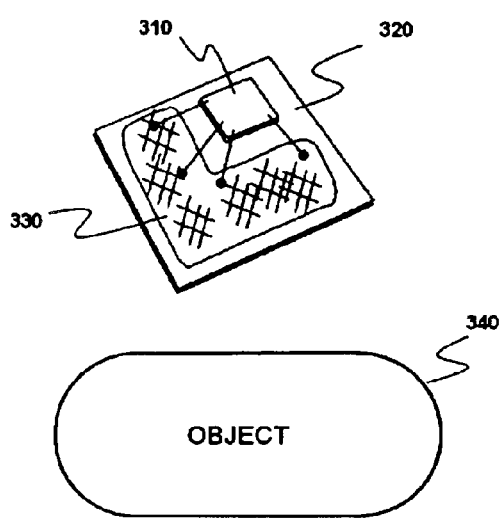
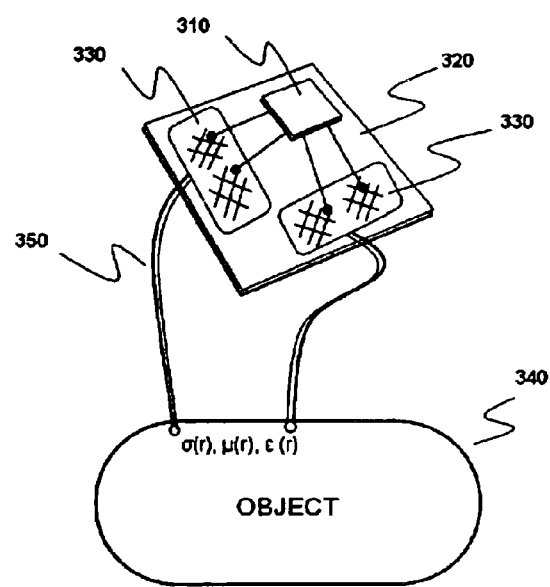

ELECTROMAGNETIC IDENTIFICATION LABEL FOR ANTI-COUNTERFEITING, AUTHENTICATION, AND TAMPER-PROTECTION

CROSS REFERENCE TO RELATED APPLICATIONS

This application is based on provisional application titled "Electromagnetic Identification label for Anti-Counterfeiting, Authentication, and Tamper Protection", application No. 60/309,394, filed Aug. 1, 2001.

BACKGROUND OF INVENTION

Field of the Invention

The present invention relates in general to methods, devices and systems for electromagnetic identification, and in particular, to electromagnetic identification labels and systems for anti-counterfeiting, authentication and tamper-protection.

Various techniques and methods have been used to prevent the counterfeiting of products and provide a means of authentication. Copy protection and authentication methods have included printing or stamping microscopic features that are difficult to reproduce, such as optical holograms (for example, U.S. Pat. No. 5,729,365). Other methods have employed the use of detectable chemical or biological compounds such as monoclonal antibodies. Yet other methods have made use of materials and inks that exhibit a detectable visual response when subject to a unique physical stimulus, such as fluorescent dye or thermochromic ink (for example, U.S. Pat. No. 6,264,107). An undesirable feature of the majority of these methods is that they either require line-of-sight or require the use of relatively expensive and complex scanner hardware.

Rather than marking the object or article directly, it is common practice to affix to the object a label containing the aforementioned physical properties for anti-counterfeiting and authentication. Examples of the use of labels for these purposes can be found in a wide range of items and products, including important documents, photographic film, audio/video tapes, designer jeans, expensive bottles of wine, designer athletic shoes, jewelry and other luxury items. Once again, the function of these labels generally rely on optical means of detection (for example, U.S. Pat. No. 4,558,318). The use of electromagnetic tags or markers for anti-counterfeiting, authentication and tamper-protection is ALSO known in the art. The basic elements of an electromagnetic tagging system are shown in FIG. 2. The radio-frequency id tag or label is affixed or embedded in an object. The object can then be scanned by a reader device that can ascertain the id code of the tag and compare it to a known value in a database (such as that shown in U.S. Pat. No. 6,201,474, for example). (An example of authentication might involve determining which of two luxury watches belongs to a given customer. An example of anti-counterfeiting might involve determining whether a particular example of a watch is genuine, or a copy.) A primary advantage of electromagnetic id labels is that line-of-sight is not required and the electronic scanner devices do not require complex electronic hardware.

The simplest form of electromagnetic tags to not provide any identification (ID) information, but simply provide a detectable signal commonly used in retail antitheft systems (U.S. Pat. No. 4,694,283, for example). Conventional electromagnetic id tags can be chip-based or "chipless". As a general matter, the information contained in chip-based tags is encoded via digital modulation of the RF signal by the electronic chip (U.S. Pat. No. 5,347,263, for example), while the information contained in chipless tags is encoded in analog signals such as frequency resonance peaks which can then be translated into a binary code (e.g., U.S. Pat. No. 5,444,223). Implementations that combine both chip-based and chipless signals are also possible (see, e.g. U.S. Pat. No. 6,232,870).

For both chip-based and chipless electromagnetic tag labels, the signal or data produced by the label is pre-programmed and fixed, set either by the data in the chip or set by the physical geometry and mechanical properties of the tag elements. While these fixed-data tags have enabled some increase in security by assigning a unique serial number to the object, there exists a continuing need for more secure ways to mark and identify products, in a "strong" manner, for identification, authentication and anti-counterfeiting.

SUMMARY OF INVENTION

The present invention is an electromagnetic ID label, comprising a tag circuit (chip-based or chipless) plus inlet, that provides additional security for article authentication and anti-counterfeiting applications. Here, the term inlet is used to describe the label substrate as well as a defined marker region that is electrically coupled to the tag circuit.

Compared to existing radio-frequency ID labels, additional security is achieved by an additional data field that is not entirely fixed or pre-programmed, but which is instead based on a variable, physical, sensor-derived input, which could even be random in nature. The physically-derived data can be a result of a physical properties of the inlet or the physical properties of the article onto which the label is affixed.

While the data field or ID code of the tag is a function of physical properties external to the tag, upon affixing the tag to the inlet and/or to the article, the data field or ID code of the tag is no longer variable but becomes fixed and static as set by the electronic material properties of the inlet and/or article. This is an important distinction between the present invention and other forms of electromagnetic tags used to remotely monitor a dynamically changing physical parameter, such as temperature or pressure (see for example, U.S. Pat. Nos. 5,227,798 and 6,255,940).

The invention includes methods, devices and systems in which authentication and/or identification information is a function of the physical properties of either the article to be authenticated, of the inlet affixed thereto (or embedded therein), or a combination of both.

Greater security is derived from the fact that the identification (ID) string generated by the tag is a complex function, i.e., a combination of a "pre-programmed" ID data field plus the physical properties external to the tag. This produces a more secure means of authenticating the article and a more robust means against counterfeiting. Since the complete id data code relies on the physical connection for the tag to the inlet and/or article, physical tampering of the label that disturbs the connections between the tag, inlet, and article can also be detected.

In accordance with the invention, the selected physical properties that determine the tag's complete ID code should be (1) representative (of the object or article); and (2) persistent. Ideally, if the externally sensed physical properties are derived from a complex geometry, or a non-obvious manufacturing process, an additional measure of security is achieved against counterfeiting simply due to the unique nature of the physical structure and the challenge of reproducing it. Depending on how the "marker" region of the label is created, it can be quite difficult or substantially impossible to duplicate the marker region's spatially-varying electrical properties without knowledge of the recipe, even if the would-be counterfeiter happens to possess the necessary raw materials.

Embodiments of the present invention include but are not limited to the following: conventional inductively-coupled RFID (see, e.g., U.S. Pat. No. 5,347,263), capacitively-coupled RFID (see, e.g., U.S. Pat. No. 6,107,920), back-scatter modulation tags (see, e.g., U.S. Pat. No. 6,100,804) as well as chipless tags. The substrate material onto which the tag circuit is placed can be paper, plastic, or cloth (see, e.g., U.S. Pat. No. 5,508,684).

Examples of embodiments of the invention include a matrix of electrically-conductive fibers in a paper, or woven into a cloth, the resistivity of which can be measured and used to generate the "variable" portion of an ID string. Thus, examples of parameters of an object that are useful in connection with the present invention include electrical conductivity, dielectric permittivity, and magnetic permeability. These parameters, in turn, can be a function of the substrate's composition, geometry, manufacture, process or subsequent treatment (e.g., heat-treating, annealing, etc.).

BRIEF DESCRIPTION OF DRAWINGS

FIGS. 3A and 3B are schematic diagrams illustrating other embodiments of the invention.

DETAILED DESCRIPTION

Figure 1:
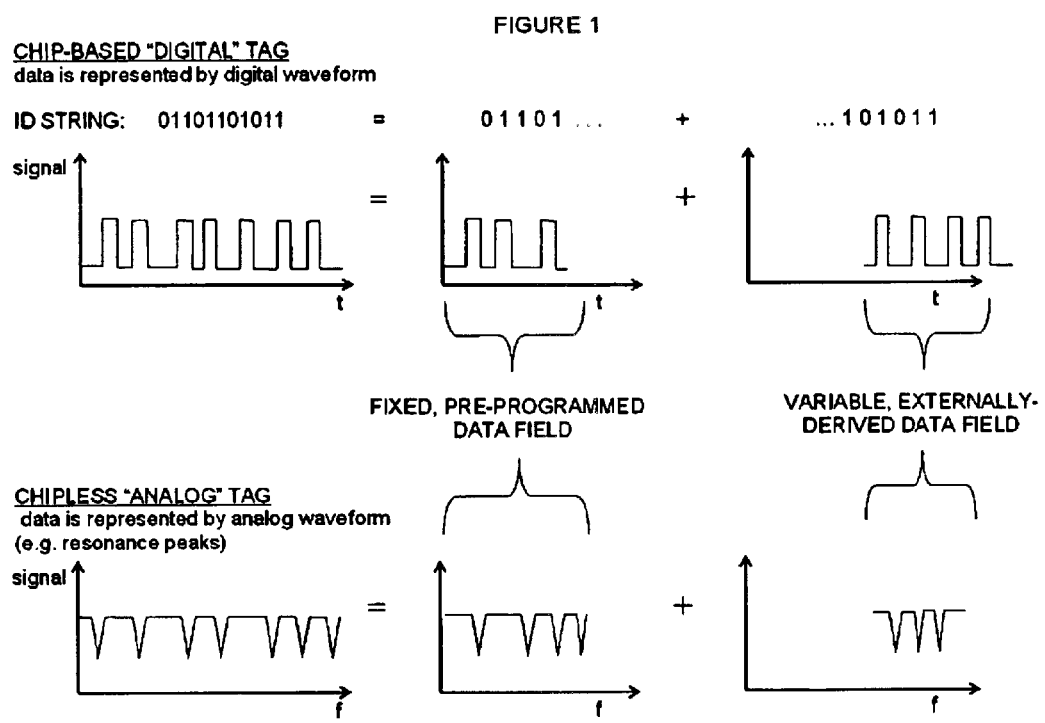
FIG. 1 is a schematic diagram illustrating the conceptual basis of the present invention.

FIG. 1 is a schematic diagram illustrating the conceptual basis of the present invention, as implemented in either digital (chip-based) or analog ("chipless") tags. (Examples of digital tags include "smart" access-control cards, commonly used to enter a secure building or locked gate. Examples of analog tags include chipless multi-resonant anti-theft tags used in retail environments) As indicated in FIG. 1, conventional tags generate only a fixed or "programmed" ID string (i.e., the first portion of the ID string shown in FIG. 1). An electronic label in accordance with the present invention, however, would produce a modified ID signal that is based not only on programmed information intrinsic to the tag circuit, but also on a quality or physical property of either the label or the object. Therefore, the combination of fixed data in the tag, plus the externally derived physical sensor data, forms a unique identifier code for the tagged object. As shown in FIG. 1, in the case of a chinless tag, this code is represented in the frequency-domain as one or more modified resonant frequency peaks; and in the case of a chip-based tag, this code is represented in the time-domain as one or more modified bit sequences output from the chip. Furthermore, in the case of a digital chip-based tag, an additional level of security can also be gained by encrypting the ID code with an encryption function F, such that the function F is also dependent on the externally-derived physical sensor data.

Figure 2:
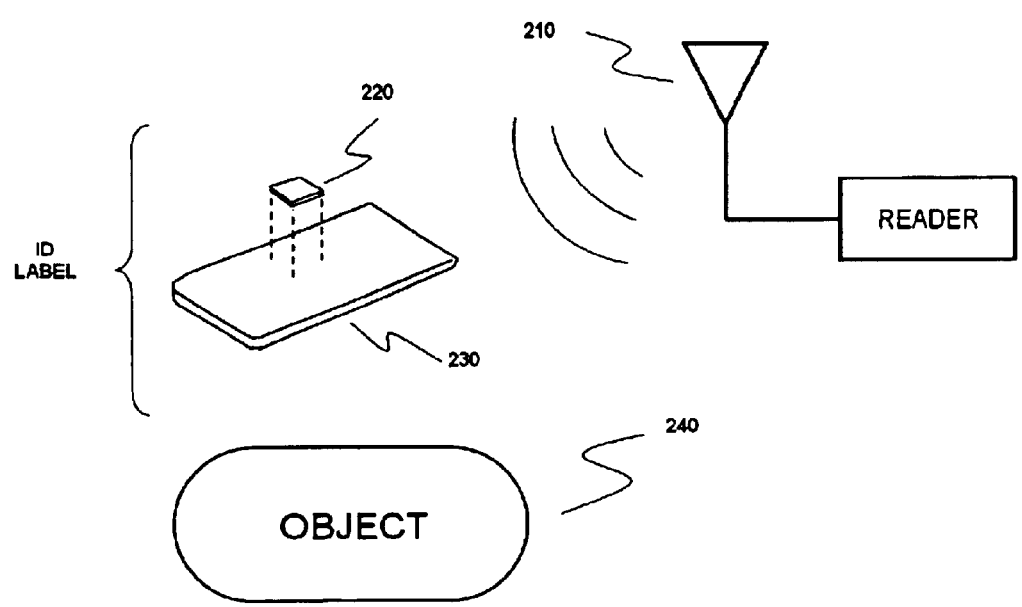
FIG. 2 is a schematic diagram depicting a typical ID (identification) system utilizing the present invention.

FIG. 2 shows a typical ID system using the invention, where the tag can be either chip-based (digital) or chipless (analog). As depicted in FIG. 2, the system would include a tag circuit 220, an "inlet" 230, a reader 210 and an object 240. The "inlet" is a material or substrate onto which the tag is affixed. The inlet could be paper plus adhesive, cloth, or other suitable material. (As used in this document, the inlet plus the tag circuit constitutes an ID "label".) The reader's function is to interpret the electromagnetic signals produced by the tag and translate them into a string of information. The structure and operation of such readers is known in the relevant area of electromagnetic tagging technology. (For example, suitable readers are discussed in the above-referenced patents.)

Other, general embodiments of the invention are depicted in FIGS. 3A and 3B, with the antenna elements omitted for clarity. In the embodiment shown in FIG. 3A the physical properties (and thus the corresponding sensor portion of the ID string) are derived from the marker region 330 on the inlet 320 and thus independent of the object. For example, a "smart label" manufacturer can combine a radio-frequency IC chip containing sensor inputs, with a custom-manufactured inlet, and the inlet can contain special physical properties making it difficult to reproduce. By way of further example, the marker region 330 can be comprised of random patterns of conductive fibers, printed patterns of conductive inks, or the inlet could be woven from a random network of conductive fibers. This renders the smart label more difficult to counterfeit. This embodiment would be suitable for labels for designer goods, such as leather goods, athletic shoes, fashion clothing, textiles and the like. A more detailed illustration of inlet 320 is shown in FIGS. 4A and 48, for the case of a chip-based label.

A further embodiment shown in FIG. 3B extends the concept of the FIG. 3a to include sensing of the physical properties of the tagged object itself. As shown in FIG. 3B, one can create an inlet such that upon placing it on the object, the tag circuit 310 has some means of sensing the electromagnetic properties of the object via direct or indirect electrical connection 350. Thus, the electromagnetic properties of the object are coupled to the label. This can be accomplished through either direct electrical connection to the object (such as by electrically conductive adhesive), or by capacitive or inductive coupling to the object. The properties of the object itself are now incorporated into the ID of the label, thus achieving a unique identifier, not only for the label, but also for the combination of label and the object.

The embodiment of FIG. 3B can be used in a variety of settings, including, for example, for authenticating bottles of wine. In such an example, the label can be placed in the cork, such that the electrical properties of the wine can be part of the unique identifier. This system could also be used to authenticate the quality of the wine. In addition, if the label is coupled to the wine bottle seal, it can also detect if the seal has been broken, thus providing a means of tamper protection and ensuring seal integrity. This same technology can be applied to other types of containers and other materials such as pharmaceutical compounds or biological substances.

Figure 4:
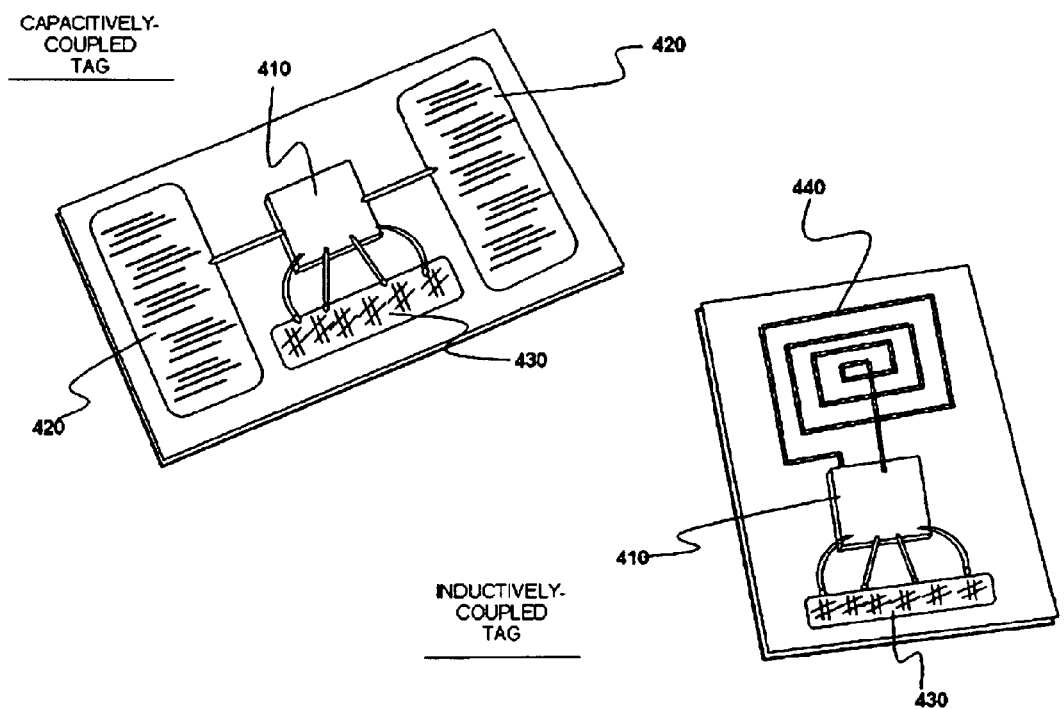
FIGS. 4A and 4B depict chip-based RFID embodiments of the invention (capacitive and inductive, respectively).

FIGS. 4A and 4B provide detail of a chip-based radio-frequency ID (RFID) embodiments; one capacitive and one inductive. In this case, it is noted that chip-based tags typically require electrical power for an external source. As shown in FIGS. 4A and 4B, therefore, antenna elements 420, 440 must also be included to provide power to the chip as well as to couple data to and from the tag reader. Antenna element 420 is a an electrically conducting patch that is suitable for capacitive coupling to the reader, and antenna element 440 is a coil which is suitable for inductive coupling to the reader. Such antenna structures are known in the art, and examples are described in the above-listed patents. The novel aspects of FIGS. 4A and 4B however, include the combination of marker regions 430 and the tag circuit 410.

What is claimed is:

1. A radio frequency identification label comprising:
    a substrate material layer; and
    a tag circuit capable of producing an electromagnetic signal containing information; and
    at least one antenna element for coupling the tag circuit to an external tag reader device; and
    at least one defined marker region of electrically conductive material that is distinct from the antenna elements and electrically coupled to the tag circuit; and
    the tag circuit arranged such that all or part of its information is dependent on the electrical properties of the marker region.

2. The radio frequency label of claim 1, wherein the tag circuit is a digital electronic integrated circuit.

3. The radio frequency label of claim 1, wherein the tag circuit is a circuit is comprised of polymer-based transistors and passive components.

4. The radio frequency label of claim 1, wherein the tag circuit is a chipless circuit comprised of one or more electrically resonant circuits consisting of a planar metal coil and distributed capacitance.

5. The radio frequency label of claim 1, wherein the substrate layer is comprised of woven cloth or threads.

6. The radio frequency label of claim 1, wherein the marker region is comprised of woven cloth or threads.

7. The radio frequency label of claim 2, wherein the label is inductively-coupled to the tag reader device.

8. The radio frequency label of claim 2, wherein the label is capacitively-coupled to the tag reader device.

9. The radio frequency label of claim 3, wherein the label is inductively-coupled to the tag reader device.

10. The radio frequency label of claim 3, wherein the label is capacitively-coupled to the tag reader device.

11. The radio frequency label of claim 7, wherein at least one marker region is also electrically coupled to the object onto which the label is affixed.

12. The radio frequency label of claim 8, wherein at least one marker region is also electrically coupled to the object onto which the label is affixed.

13. The radio frequency label of claim 9, wherein at least one marker region is also electrically coupled to the object onto which the label is affixed.

14. The radio frequency label of claim 10, wherein at least one marker region is also electrically coupled to the object onto which the label is affixed.

15. The radio frequency label of claim 4, wherein at least one marker region is also electrically coupled to the object onto which the label is affixed.

16. The radio frequency label of claim 7, wherein the marker region is comprised of a printed pattern of electrically conductive ink.

17. The radio frequency label of claim 8, wherein the marker region is comprised of a printed pattern of electrically conductive ink.

18. The radio frequency label of claim 9, wherein the marker region is comprised of a printed pattern of electrically conductive ink.

19. The radio frequency label of claim 10, wherein the marker region is comprised of a printed pattern of electrically conductive ink.

20. The radio frequency label of claim 2, wherein the information generated by the tag circuit is encrypted by a mathematical function that is dependent on the electrical properties of the marker region.

21. The radio frequency label of claim 2, wherein the information generated by the tag circuit is encrypted by a mathematical function that is dependent on a parameter derived from the electrical properties of the marker region.

22. The radio frequency label of claim 7, wherein at least one marker region is also electrically coupled to the object onto which the label is affixed, wherein the information transmitted by the radio frequency identification label is also dependent on the electrical properties of the object.

23. The radio frequency label of claim 8, wherein at least one marker region is also electrically coupled to the object onto which the label is affixed, wherein the information transmitted by the radio frequency identification label is also dependent on the electrical properties of the object.

24. The radio frequency label of claim 9, wherein at least one marker region is also electrically coupled to the object onto which the label is affixed, wherein the information transmitted by the radio frequency identification label is also dependent on the electrical properties of the object.

25. The radio frequency label of claim 10, wherein at least one marker region is also electrically coupled to the object onto which the label is affixed, wherein the information transmitted by the radio frequency identification label is also dependent on the electrical properties of the object.

26. The radio frequency label of claim 4, wherein at least one marker region is also electrically coupled to the object onto which the label is affixed, wherein the information transmitted by the radio frequency identification label is also dependent on the electrical properties of the object.

* * * * *